United States Patent
Ngo et al.

(10) Patent No.: US 7,146,990 B1
(45) Date of Patent: Dec. 12, 2006

(54) PROCESS FOR REPAIRING SULFIDATION DAMAGED TURBINE COMPONENTS

(75) Inventors: Ky D Ngo, Imperial, CA (US); David C. Fairbourn, Sandy, UT (US); Xuan Nguyen-Dinh, Mexicali, CA (US)

(73) Assignee: Chromalloy Gas Turbine Corporation, San Antonio, TX (US)

( * ) Notice: Subject to any disclaimer, the term of this patent is extended or adjusted under 35 U.S.C. 154(b) by 0 days.

(21) Appl. No.: 11/189,347

(22) Filed: Jul. 26, 2005

(51) Int. Cl.
   *B08B 9/00* (2006.01)

(52) U.S. Cl. .............. 134/22.1; 134/22.11; 134/22.16; 134/26; 134/42

(58) Field of Classification Search .............. 134/22.1, 134/22.11, 22.15, 26, 42
See application file for complete search history.

(56) References Cited

U.S. PATENT DOCUMENTS

| | | | |
|---|---|---|---|
| 3,015,589 A * | 1/1962 | Everson et al. ............... 134/42 |
| 3,276,903 A * | 10/1966 | Galmiche .................. 427/253 |
| 3,493,476 A * | 2/1970 | Lucas et al. ................ 205/193 |
| 4,305,697 A * | 12/1981 | Cohen et al. ............ 415/210.1 |
| 5,217,757 A | 6/1993 | Olson et al. |
| 5,614,054 A * | 3/1997 | Reeves et al. .............. 156/344 |
| 5,685,917 A * | 11/1997 | Sangeeta ........................ 134/2 |
| 5,898,994 A * | 5/1999 | Miller et al. ............... 29/889.1 |
| 6,217,668 B1 * | 4/2001 | Czech et al. .................... 134/3 |
| 6,367,686 B1 * | 4/2002 | Abriles et al. ............. 228/206 |
| 6,605,161 B1 | 8/2003 | Fairbourn |
| 2001/0009246 A1 * | 7/2001 | Zimmerman et al. ......... 216/34 |
| 2003/0136811 A1 * | 7/2003 | Philip ......................... 228/119 |
| 2004/0074873 A1 * | 4/2004 | Kool et al. ................. 216/109 |
| 2004/0247789 A1 * | 12/2004 | Boucard et al. ............ 427/253 |
| 2005/0166397 A1 * | 8/2005 | Ng ............................ 29/889.1 |

FOREIGN PATENT DOCUMENTS

EP   0813930 A2 * 12/1997

* cited by examiner

*Primary Examiner*—Sharidan Carrillo
(74) *Attorney, Agent, or Firm*—Mitchell D. Bittman

(57) ABSTRACT

A process is provided for cleaning a surface of an internal cavity of a gas turbine component having sulfidation or sulfur bearing deposits comprising: inserting into the internal cavity a fluoride salt; and heating the fluoride salt and the component in an inert atmosphere for a time and at a temperature to clean the sulfidation or sulfur bearing deposits on the surface. In a preferred embodiment the cleaned internal surface is then coated with a metallic coating.

26 Claims, No Drawings

PROCESS FOR REPAIRING SULFIDATION DAMAGED TURBINE COMPONENTS

FIELD OF THE INVENTION

This invention relates to the cleaning of sulfidation or sulfur bearing deposits on internal surfaces of turbine engine components and, more particularly, to the repair of such components by cleaning and coating the internal surfaces.

BACKGROUND OF THE INVENTION

Turbine components are subjected to extreme conditions of gas temperature and pressure, and stress during operation. Many turbine components, particularly those called low pressure turbine (LPT) components are exposed to two possible regimes of elevated temperature attack. One is a high temperature oxidation typified by an accelerated growth of a metal oxide from a combination of the metal and oxygen. The other type results from a lower temperature attack caused primarily by sulfur combination with the metal. This low temperature attack is called sulfidation and is typical of parts with operating temperatures below about 1550° F. (845° C.).

LPT components are typically made from nickel based superalloys. They may be coated or uncoated. They may be air cooled, hollow and not air cooled, or solid and not air cooled. The sulfidation attack causes a thinning of the wall sections leading to potential component failure from inadequate or too thin material. The sulfidation permits oxygen to further attack the components leading to rapid demise once sulfidation starts.

The original engine manufacturers have given instructions to inspect their components for sulfidation. If found, the components were considered to be scrap and the components must then be replaced with new components. One engine manufacturer prescribes magnetic flux permeability measurements with a magnetoscope, such as a Magnestoscop 1.069 (sold by Institut Dr. Förster, Reutlingen, Germany) as a means to ensure that components with heavy sulfidation attack be removed from service. Generally when such components exhibit magnetic flux permeability measurements exceeding a threshold value of, for example 1.060, the component is removed from service. These components are expensive and to assure safety, it is necessary that the components be periodically cleaned and inspected. The inspection must include the ability to measure the wall thickness net of the damage from the sulfidation attack.

In other components, e.g. high pressure turbine blades, there may be deposited in the internal cavities a sulfur bearing deposit, such as an aggregation of alumina silicate and calcium sulfate, which is referred to as runway sweepings or Arizona Road dust. Cleaning these deposits has also been a problem.

One method of cleaning the internal cavities of these components has been to perform a fluoride ion cleaning (FIC) by injecting fluoride gas into a proper reactor. The gases displace the sulfur atoms with fluoride atoms. In a subsequent operation, the fluorides are removed from the component using high temperature and high vacuum (e.g. $10^{-4}$ torr). Unfortunately, FIC cleaning is not always effective. The gas path may not be through the part, restricting the ability of the gas to flow into blind pockets. Inadequately flowed HF gas, into the numerous small cavities of the part, does not always work well. HF cleaning may also require the use of pipes to conduct the gases which raise the cost of the system. In addition, HF is a toxic gas and care must be exercised to protect employees.

Another method of cleaning internal surfaces is by the use of mechanical methods such as grit blasting to remove the sulfidation attack. Often, these blind or inaccessible cavities are not readily accessible to allow use of these methods.

It is also difficult to utilize acids internal to the part to remove sulfidation. Acid applied to the part results in the formation of a smut on the surface. The smut is a black residue consisting of mostly engine induced oxides and sulfides of indeterminate chemistry.

To further repair the surface may require the application of a diffusion coating at high temperature. The smut would inhibit such a deposit by imparting a black smut line underneath the surface of the coating. It is the intention of this invention to clean components suffering from sulfidation damage or sulfur bearing deposits and coat these surfaces to provide a repaired component that is ready for use in the turbine engine. The repair method also restores the permeability readings to a level deemed acceptable to the original equipment manufacturer.

SUMMARY OF THE INVENTION

Briefly, a process is provided for cleaning a surface of an internal cavity of a gas turbine component having sulfidation or sulfur bearing deposits comprising: inserting into the internal cavity a fluoride salt; and heating the fluoride salt and the component in an inert atmosphere for a time and at a temperature to clean the sulfidation or sulfur bearing deposits on the internal surface. In a preferred embodiment the cleaned internal surface is subsequently coated with a metallic coating.

DETAILED DESCRIPTION OF THE INVENTION

The process of this invention cleans the surface of an internal cavity of a turbine component by use of a fluoride salt. Generally this salt is in a solid form which can be ground into a powder for insertion into the cavity. Suitable fluoride salts include ammonium fluoride, ammonium bifluoride, sodium fluoride, potassium fluoride, aluminum fluoride, as well as other alkali-fluoride salts, alkali earth-fluoride salts and metal fluoride salts. Ammonium bifluoride is a preferred salt as the amine functional group imparts a cleaning function without the possibility of leaving behind an alkali metal deposit, it is stable in a solid form, it can be ground into a powder and is user friendly. In one example ammonium bifluoride is ground into a powder and filled into the internal cavity of the LPT blade.

In a heat process, the blade is oriented such that it will retain the fluoride salt when it is heated. The fluoride salt first turns to a liquid and then turns to a gas. In the gaseous form the fluoride ion becomes disassociated from the remaining portion of the molecule and can readily react to replace or provide chemical reactivity with the sulfidation or sulfur bearing deposit to be removed. Generally, the fluoride salt and component are heated for a time and temperature effective to clean the sulfidation or sulfur bearing deposits, generally at temperatures of about 1100 to 1500° F. (595 to 815° C.), preferably about 1400° F. (760° C.), for ¼ to 4 hours, preferably about ½ hour, to clean the sulfidation or sulfur bearing deposits. The cleaning process is performed under an inert atmosphere, e.g. argon, which excludes oxygen to avoid damage to the components.

In one case, a sulfur bearing deposit is an aggregation containing alumina silicate and calcium sulfate, called runway sweepings or Arizona Road dust. In the HPT (high pressure turbine) T1 blade of the JT8D-219 Pratt and Whitney aircraft engine this deposit is extremely difficult to remove. Leaving it in place during engine operation subjects the blade to potential incipient melting caused when the residue blocks the cooling air flow or to creep rupture caused by a combination of high temperature and stress. Ammonium bifluoride is added to the internal cavity, and then heated to a minimum temperature of 1100° F. (595° C.) in a furnace with an argon or nitrogen atmosphere, causing a boiling of the chemical against the deposit. The fluoride ion reacts with the deposit becoming liquid or gaseous. Eventually the deposit is substantially reduced or completely removed in this manner. A black residue is left after this process, which can be removed by passing a dilute acid through the part and then washing with water to remove the acid. One such dilute acid would be a solution of nitric and hydrochloric acid in dilute concentrations (e.g. less than ½molar).

To protect the cleaned surface a coating process provides a thin protective layer. Various coating processes are known for coating components. Various metallic coatings can be used to protect and restore the surface including those based on nickel, aluminum, cobalt, chromium, silicon and combinations thereof. For providing protection to the component at internal temperatures below 1500° F. (815° C.), a preferred coating is a chromide coating. One coating method involves inserting into the internal cavity a coating mixture comprising about 10 to 30 wt % of a metal powder, about 70 to 90 wt % of an inert filler such as alumina, and about 1 to 2% wt of a halide activator. Preferred activators are ammonium chloride or ammonium bifluoride. The component and the coating mixture are heated for a time and at a temperature effective to coat the internal surfaces with the metal coating, typically at temperatures of about 1850 to 2000° F. (1000 to 1100° C.) for about 2 to 15 hours.

In one embodiment, the coating process involves mixing chromium powder with an alumina and a halide activator, filling the internal cavity with this mixture, then heating in a furnace at 1975° F. (1080° C.) for two hours or more to obtain a diffused chromide coating. Using this method, slight damage previously caused by the sulfidation can be repaired. The resulting coating is acceptable as a chromide coating with the surface contamination substantially or completely removed.

Other coating methods, as are known in the art, may also be used to coat the cleaned internal surface depending upon the accessibility of the internal surface to coating by such method.

Where permeability measurements are slightly over this threshold value (say 1.068, for example) the cleaning and coating process of this invention can salvage the part for further engine service. Generally, the cleaning process will chemically remove most, and preferably substantially all of the sulfidation deposits. The chromium deposited in the coating step can diffuse through any remnant deposit layer left over from the fluoride cleaning process. It is theorized that the fluoride cleaning acts as an activation process whereby the remnant layer becomes more porous, thus allowing the chromium to readily diffuse through it during the coating process. As a result, a chromide coating is deposited between the base metal and any remnant layer. Permeability measurement at the same location of the component (where the permeability is marginally greater than the threshold value) will be lower, due to the presence of the chromide coating. Advantageously this cleaning and coating process provides enhanced sulfidation resistance to the gas turbine components.

EXAMPLE

The following process is used to remove sulfidation attack by-products in the internal cavities of LPT components. The cleaning and coating process is summarized as follows:
a) Grind ammonium bifluoride (ABF) crystals into powder;
b) Fill the internal cavity of a JT8D LPT component with the ABF powder;
c) Place component in a furnace with the cavity closed end down;
d) Set the furnace temperature to 1400° F. (760° C.), and subjecting the component in an inert argon atmosphere to this temperature for 30 minutes;
e) Remove component from furnace at the end of the ABF cleaning cycle;
f) Immerse component in 10% diluted Aqua Regia (1 part $HNO_3$, 3 parts HCL) at 50° C. (122° F.) for 30 minutes to wash the black residue from the part;
g) Rinse component thoroughly with water, then dry;
h) Fill internal cavity with the following powder mixture (by weight): 20% chromium powder (100 mesh), 79% alumina powder (+325 mesh), 1% ammonium chloride or ground ABF;
i) Place component in an argon purged furnace, then set the furnace temperature to 1925° F. (1050° C.);
j) Leave component in furnace at 1925° F. (1050° C.) for 11 hours, then remove when furnace temperature is below 400° F. (205° C.); and
k) Use various mechanical means (such as wire) to remove powder from the internal cavity.

The resultant internal cavity of the component is cleaned of sulfur deposits and exhibits a chromide coating which is equivalent to the original coating. The repair procedure also restores the magnetic flux permeability readings to that of the originally manufactured part.

The invention claimed is:

1. A process for cleaning a surface of an internal cavity of a gas turbine component having sulfidation or sulfur bearing deposits comprising:
   inserting into the internal cavity a fluoride salt in solid form; and
   heating the fluoride salt and the component in an inert atmosphere for a time and at a temperature effective to remove the sulfidation or sulfur bearing deposits on the surface.

2. A process of claim 1 wherein the fluoride salt is selected from the group consisting of alkali fluoride salt, alkali earth fluoride salt and metal fluoride salt.

3. A process of claim 1 wherein the gas turbine component is a low pressure turbine component.

4. A process of claim 1 wherein the sulfur bearing deposits contain an alumina silicate.

5. A process of claim 1 wherein the inert atmosphere is an argon atmosphere.

6. A process of claim 2 wherein the fluoride salt is in the form of a powder.

7. A process of claim 2 wherein the fluoride salt and component are heated to a temperature from about 1100 to 1500° F. for about ¼ to 4 hours to remove the sulfidation or sulfur bearing deposits.

8. A process of claim 4 wherein the component is a high pressure turbine blade.

9. A process of claim 6 wherein the fluoride salt is selected from the group consisting of ammonium bifluoride, potassium fluoride, aluminum fluoride, sodium fluoride and ammonium fluoride.

10. A process of claim 9 wherein the fluoride salt is ammonium bifluoride.

11. A process of claim 10 wherein the cleaning process chemically removes substantially all of the sulfidation or sulfur bearing deposits.

12. A process for repairing a surface of an internal cavity of a gas turbine component having sulfidation or sulfur bearing deposits comprising:
    inserting into the internal cavity a fluoride salt in solid form;
    heating the fluoride salt and the component in an inert atmosphere for a time and at a temperature effective to remove the sulfidation or sulfur bearing deposits on the surface; and
    coating the cleaned surface with a metallic coating.

13. A process of claim 12 wherein the metal coating is applied to the surface by inserting a metal coating powder containing an activator into the cleaned internal cavity; and
    heating the coating powder and the component for a time and at a temperature to coat the surface with the metal coating; and
    removing any residual of the coating powder from the internal cavity.

14. A process of claim 12 wherein the fluoride salt is selected from the group consisting of alkali fluoride salt, alkali earth fluoride salt and metal fluoride salt.

15. A process of claim 12 wherein the metal coating is a chromide coating.

16. A process of claim 12 wherein the gas turbine component is a high pressure turbine component.

17. A process of claim 13 wherein the cleaning process chemically removes substantially all of the sulfidation or sulfur bearing deposits.

18. A process of claim 13 wherein the metal coating is applied by inserting into the internal cavity a coating mixture which comprises from about 10 to 30 wt % of a metal powder, about 70 to 90 wt % of an inert filler powder and about 1 to 2 wt % of a halide activator.

19. A process of claim 14 wherein the fluoride salt is in the form of a powder.

20. A process of claim 14 wherein the fluoride salt and component are heated to a temperature from about 1100 to 1500° F. for about ¼ to 4 hours to remove the sulfidation or sulfur bearing deposits.

21. A process of claim 18 wherein the metal powder is a chromium powder and the inert filler powder is alumina.

22. A process of claim 18 wherein the coating mixture and component are heated at a temperature of about 1850 to 2000° F. for 2 to 15 hours to coat the surface of the internal cavity.

23. A process of claim 19 wherein the fluoride salt selected from the group consisting of ammonium bifluoride, potassium fluoride, aluminum fluoride, sodium fluoride and ammonium fluoride.

24. A process of claim 21 wherein the halide activator is ammonium chloride or ammonium bifluoride.

25. A process of claim 21 wherein the gas turbine component is a low pressure turbine component.

26. A process of claim 23 wherein the fluoride salt is ammonium bifluoride.

* * * * *